June 15, 1971   W. D. GREENLEES   3,585,100
RESIN PLUS AGGREGATE PANELS WITH HONEYCOMB STRUCTURE
AND METHOD FOR MAKING THE PANELS
Filed Feb. 11, 1969
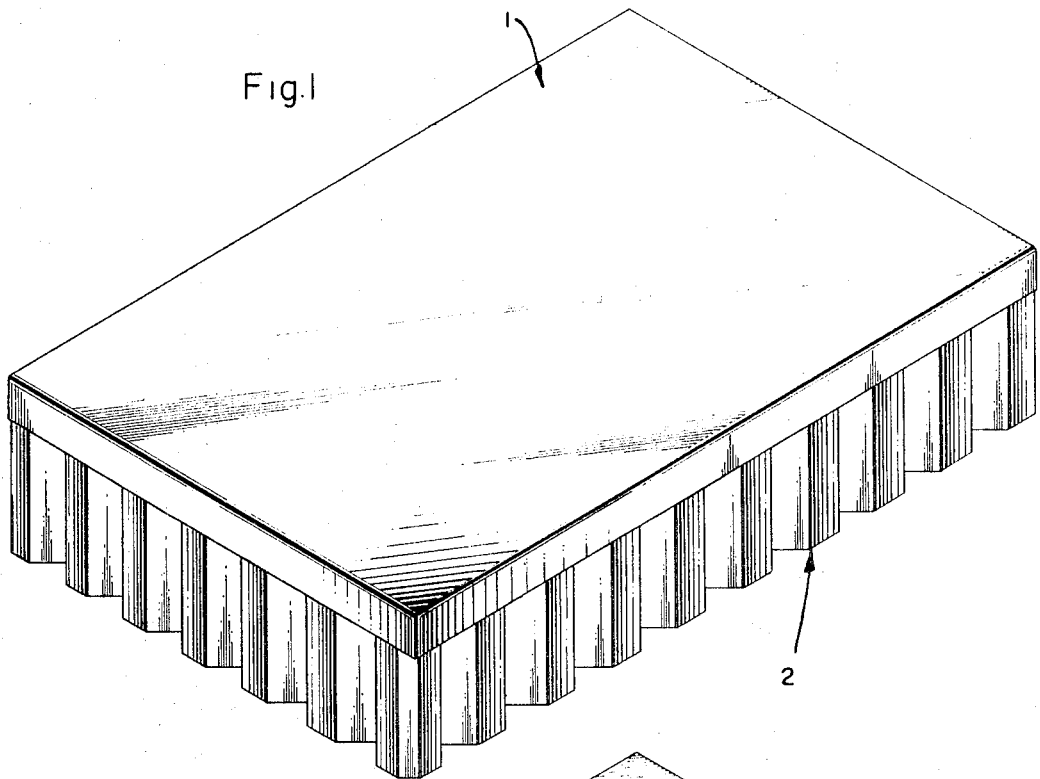
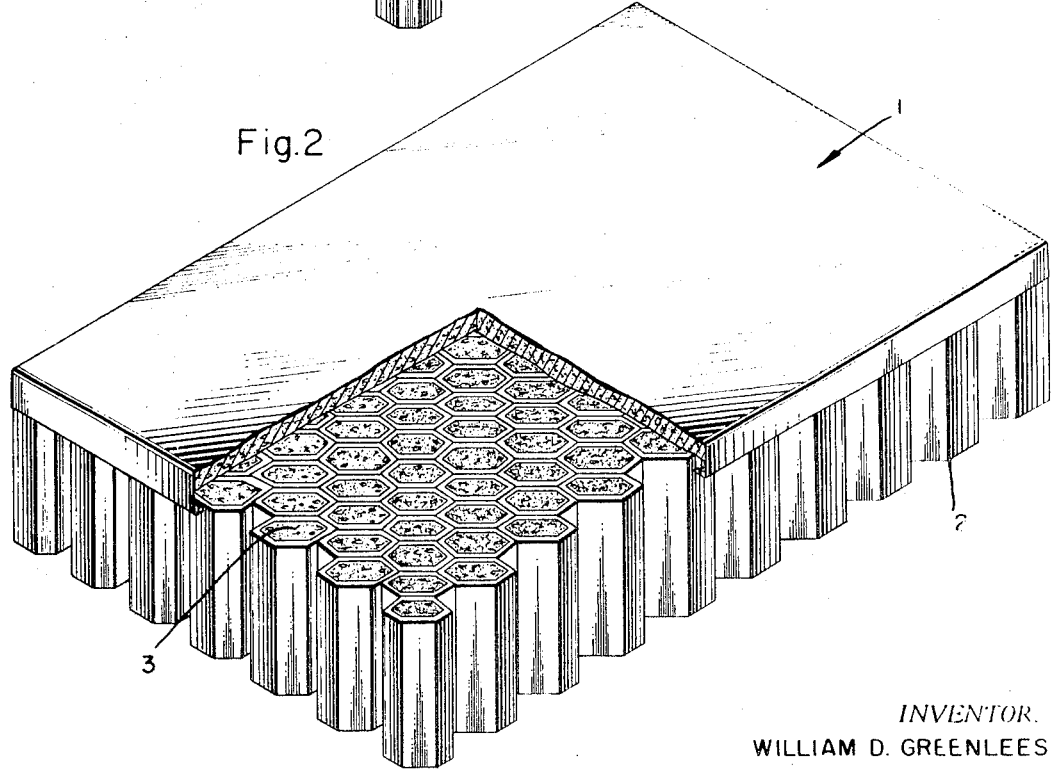
INVENTOR.
WILLIAM D. GREENLEES United States Patent Office 3,585,100
Patented June 15, 1971

3,585,100
RESIN PLUS AGGREGATE PANELS WITH HONEYCOMB STRUCTURE AND METHOD FOR MAKING THE PANELS
William D. Greenlees, Alexandria, Va.
(Rte. 1, Box 711L, Accokeek, Md. 20607)
Continuation-in-part of application Ser. No. 450,675, Apr. 26, 1965. This application Feb. 11, 1969, Ser. No. 801,241
Int. Cl. B32b 3/12
U.S. Cl. 161—68
9 Claims

ABSTRACT OF THE DISCLOSURE

Molded panels and the method of manufacturing the panels are disclosed. The panels consist of resin plus aggregate with a honeycomb structure imbedded in the resin-aggregate mixture. The panels are light weight, have a surface hardness equivalent to marble, can be produced in any color, can be made to have a marble like appearance, and are moisture resistant. Briefly, the panels are manufactured by mixing the aggregate and resin along with the desired dye in a mixer; the mix is poured into a mold that is vibrated during pouring; after the mold is filled, the honeycomb is pressed into the back of the mix; the mold is then placed in an evacuated heat chamber; removed from the heat chamber and placed in a heat tunnel. After the mold travels the length of the heat tunnel, it is cooled and the panel is removed.

BACKGROUND OF THE INVENTION

This is a continuation-in-part of my application Ser. No. 450,675 filed Apr. 26, 1965 now abandoned.

This invention relates to panel structures, and more particularly to a molded panel structure and the method of manufacturing the molded panels.

In recent years the building industry has been using more and more products made of resin or products containing resins. One such product is a panel made of resin or resin plus an aggregate. The aggregates most commonly used are sand and marble chips.

This invention is related to the resin plus aggregate type panel. These panels are produced in various colors and can be marbleized to give the panel a marble like appearance. The panels are used as wall panels, vanity tops or the like.

While resinous panels have gained acceptance by builders and decorators, the panels available on the market today have several major disadvantages. For example, the panels presently on the market are very heavy and when compared with other building materials are expensive.

The resin plus aggregate panels are relatively expensive due primarily to manufacturing problems. One such problem is warping. When one attempts to manufacture panels of appreciable size by the presently used methods, a high rate of rejection results due to warping. Another problem is air entrapped in the panel. The entrapped air causes flaws in the surface of the panel.

I have invented a new panel that is relatively light in weight and inexpensive.

My panels consist of resin plus quartz aggregate backed by a honeycomb structure. My panels are relatively light weight, have a surface hardness equivalent to marble, can be produced in any color, can be made to have a marble like appearance, are moisture resistant, and are relatively inexpensive.

SUMMARY OF THE INVENTION

Therefore, an object of my invention is to provide a panel structure.

Another object of my invention is to provide a panel structure having a marble or rock like appearance.

A further object of my invention is to provide a panel structure having a hard mar-resistant surface.

A still further object of my invention is to provide a method of manufacturing a resinous building material.

BRIEF DESCRIPTION OF THE DRAWING

These and other objects will become apparent from the following detailed description when read in conjunction with the accompanying drawing in which:

FIG. 1 is a perspective view of my finished product; and

FIG. 2 is another perspective view showing a portion of the honeycomb backing.

DESCRIPTION OF THE INVENTION

Referring now to the drawing, my panel consists of an upper surface 1 of resin plus aggregate. The aggregate that I use is crushed quartz. The resin may be any suitable resin such as polyesters, epoxies, acrylics or other castable resins. Surface 1 may be any color. The color desired is obtained by the use of dyes or by selecting the desired shade of quartz. For example, if a white surface is desired, white quartz is selected as the aggregate and clear resin is used; or a white pigment can be added.

While any ratio of quartz and resin can be used, I have found that a ratio of 80% quartz and 20% resin, by weight, is the most desirable ratio. This ratio is governed by cost considerations, ease of manufacturing, and the characteristics of the finished product among other things.

A honeycomb is imbedded into the panel. The honeycomb 2 has a plurality of hexagonal openings 3. Surface 1 penetrates into the honeycomb to a depth of $\frac{1}{32}$ to $\frac{1}{8}$ inch. The honeycomb can penetrate into surface 1 to a depth greater than $\frac{1}{8}$ inch, however for most purposes $\frac{1}{8}$ inch penetration will be the required maximum.

Honeycomb 2 may be made of any suitable material such as aluminum, steel, paper, resin impregnated paper, or the like. Due to its light weight and strength, I have found aluminum honeycomb to be the most desirable type of honeycomb.

While FIGS. 1 and 2 show the honeycomb exposed, the panels can be molded in such a manner that surface 1 covers the sides as well as the top of the honeycomb. This type of panel is made where the use contemplated is such that the sides will be exposed. Of course, the honeycomb can be cut flush with the bottom of surface 1.

Surface 1 can be a solid color or dyes and pigments can be used to marbleize the surface. When surface 1 is marbleized, the finished product has the appearance of true marble. This is another reason why I use crushed quartz. I have found that my panels more nearly resemble marble when I use crushed quartz rather than the conventional aggregates.

Having described the product itself, I will now describe the method I use to manufacture my panels. The ingredients are first weighed out to a ratio of 80% crushed quartz to 20% resin. The particle size of the quartz used varies with the appearance desired. If a fine grain appearance is desired, finely crushed quartz is used. If a more coarse surface appearance is desired, a larger particle size is used.

If the panel is to be colored, the proper dye or pigment is mixed with the resin. A suitable curing catalyst such as methylethylketone peroxide or benzoyl peroxide, or the like, is then thoroughly mixed with the resin. After the catalyst has been added, the quartz and resin are mixed together in a dough type mixer. If the panel is to be marbleized a small amount of pigment other than the pigment used to color the panel are added while the quartz and resin are being mixed. Marbleizing can also be obtained by adding a mixture of resin, quartz and marbleizing dye to the main batch of resin and quartz while the main batch is in the mixer. This extra pigment or extra resin and quartz and dye add streaks of color to the panel.

After mixing in the dough type mixer, the mix is poured into a mold that has been previously coated with a mold release agent such as Dow Corning D.C. 20 or if surface 1 is to be gel coated, with a gel coat release agent. While the mix is being poured into the mold, the mold is vibrated to allow the mix to flow over the mold surface and into place. Vibrating the mold tends to flatten out any surface air bubbles that might be present.

After the mold is filled to a depth of approximately ¼ of an inch, the honeycomb is pressed into the mix. This is accomplished by the use of a large flat surface to insure uniform penetration across the entire surface of the mix. The edges of the mold may be used as stops for the large area flat surface. The honeycomb is held in place by a rigid grid work or the like secured to the mold.

The mold is then placed in a vacuum chamber and heat is applied to the mix by the use of infrared lamps or the like. The heat is applied until the resin attains a very low viscosity. At the point, the chamber is evacuated to approximately 15 to 29 inches of mercury. The vacuum is held for about 5 minutes and then released. The vacuum chamber is used to deaerate the part. This eliminates air bubbles from surface 1. As has been mentioned above, the presence of air bubbles at the surface of resinous slabs has been a problem to the industry. These air bubbles break at the surface thereby causing pits. If this happens, the panel is ruined. By vibrating the mold during pouring and by the use of a vacuum and heat I have essentially eliminated the problem of air bubbles.

After the vacuum is released, the mold is removed from the vacuum chamber and placed on a conveyor belt that carries it through a heat tunnel to complete the cure of the resin. The heat tunnel has forced air heat flowing through it and is approximately 50 feet long. The mold is in the tunnel for about 25 minutes.

When the mold is removed from the tunnel, it is cooled and removed from the mold. After removal from the mold, the honeycomb can be cut flush with surface 1 or the panel can be used as is. Whether or not the honeycomb is cut depends upon how the panel is to be used. If it is used as a wall panel or floor tile, the honeycomb will be hidden from sight, and therefore need not be cut. Furthermore, it would be undesirable to cut the honeycomb on wall panels because it provides a layer of insulation. If the sides are exposed, the honeycomb may be cut flush with surface 1, however, if surface 1 is molded along the sides of the honeycomb, the honeycomb is not cut because it is not exposed.

What I have described above is a novel resinous panel structure that is relatively light in weight, has a very hard surface, is essentially opaque, is relatively inexpensive to manufacture and is attractive in appearance. I have also described a new process of making such wall panels.

While it is true that panels of resin plus an aggregate are available on the market today, to my knowledge, I have invented the first molded panel using a honeycomb in the manner described. The use of honeycomb in a molded panel has several advantages, especially when used with resinous panels. For example, in a molded panel of resin and aggregate the upper surface of the mold is rich in resin because the aggregate tends to settle to the bottom of the mold. The upper surface of the mold being rich is resin cures faster than the resin in the bottom of the mold. This creates a stress that causes warping. Warping has been one of the major, if not the major, problems in the industry. The honeycomb breaks up the stress patterns, and thereby eliminates the warpage.

In addition to breaking up the stress pattern, the honeycomb provides for a lighter weight panel, provides a layer of insulation, and tends to make the panels somewhat flexible. Also various types of fasteners can be attached to the honeycomb.

Of course any method other than the desired method just described can be used to make my panels. The important point being that the honeycomb is used in such a manner that it breaks up the stress patterns set up in the panel during curing.

While I have shown and described a preferred form of my panel and a preferred method of making my panels, it will be obvious to those skilled in the art that various changes and modifications may be made without departing from the spirit or scope of my invention.

I claim:

1. The method of manufacturing a panel structure comprising the steps of (1) weighing out 20% resin and 80% crushed quartz, (2) adding a curing catalyst to said resin, (3) mixing the resin and crushed quartz in a mixer, (4) pouring the mixture of resin and quartz in a mold that is being vibrated, (5) pressing a honeycomb structure into the mixture in the mold, (6) securing the honeycomb structure in place, (7) placing the mold in a vacuum chamber, (8) applying heat to the mold until the resin attains a state of low viscosity, (9) drawing a vacuum in the chamber, (10) releasing the vacuum, (11) removing the mold from the vacuum chamber, (12) placing the mold on a conveyor belt in a heat tunnel, (13) removing the mold from the heat tunnel when it reaches the end of the heat tunnel, (14) cooling the mold, and (15) removing the panel from the mold.

2. The process according to claim 1 wherein a coloring agent is added to the resin before the curing catalyst is added.

3. The process according to claim 1 wherein a coloring agent is added to the mix in the mixture to marbleize the panel surface.

4. The process according the claim 1 wherein the mixture is mixed in the mixer for approximately 5 minutes, the vacuum chamber is evacuated to approximately 15 inches of mercury and is held for about 5 minutes and wherein the heat tunnel is 50 feet long and the mold remains in the tunnel for about 25 minutes.

5. A panel structure comprising: a castable polymer resin plus crushed quartz mixture and a honeycomb structure imbedded into the mixture of quartz and resin in such a manner that the honeycomb structure forms an integral part of the panel, said panel being manufactured by the steps of:
  (1) mixing said castable polymer resin with said crushed quartz;
  (2) pouring said mixture of quartz and resin into a mold;
  (3) pressing a honeycomb structure into the back of said mixture of quartz and resin to a sufficient depth to penetrate through the resin rich surface formed by the quartz settling to the bottom of the mold; and
  (4) curing said resin with said honeycomb in place.

6. A panel structure as defined in claim 5 wherein a pigment is added to said mixture of castable polymer resin and quartz to impart a color to said panel structure.

7. A panel structure as defined in claim 5 wherein a pigment is added to said mixture of castable polymer resin and quartz in a non-uniform manner to impart a marble like appearance to said panel structure.

8. A panel structure as defined in claim 5 wherein said mold is vibrated after said mixture of castable polymer resin and quartz is poured into said mold to remove entrapped air and to assist in the settling of the quartz to the bottom of the mold.

9. A panel structure as defined in claim 8 wherein said honeycomb structure penetrates through said resin rich surface and into said settled quartz.

References Cited

UNITED STATES PATENTS

| | | | |
|---|---|---|---|
| 1,931,667 | 10/1933 | Loetscher | 117—39 |
| 2,751,775 | 6/1956 | Sergovic | 161—43 |
| 2,951,004 | 8/1960 | Martin et al. | 161—184X |
| 3,103,460 | 9/1963 | Picket | 161—69 |
| 3,306,956 | 2/1967 | Barnette | 161—68X |
| 3,328,231 | 6/1967 | Sergovic | 161—162 |

JOHN T. GOOLKASIAN, Primary Examiner

H. F. EPSTEIN, Assistant Examiner

U.S. Cl. X.R.

156—61, 242, 246, 286; 161—19; 264—71, 102